United States Patent
Arya et al.

[11] Patent Number: 5,872,687
[45] Date of Patent: Feb. 16, 1999

[54] TRANSDUCER SUSPENSION SYSTEM

[75] Inventors: Satya Prakash Arya; A. David Erpelding; Darrell Dean Palmer; Surya Pattanaik, all of San Jose, Calif.

[73] Assignee: International Business Machines Corporation, Armonk, N.Y.

[21] Appl. No.: 917,154

[22] Filed: Aug. 25, 1997

[51] Int. Cl.$^6$ .............................. G11B 5/48; G11B 21/16
[52] U.S. Cl. ................................................ 360/104
[58] Field of Search .................................... 360/104, 103, 360/105–106, 108

[56] References Cited

U.S. PATENT DOCUMENTS

| | | | |
|---|---|---|---|
| 4,761,699 | 8/1988 | Ainslie et al. | 360/103 |
| 4,787,000 | 11/1988 | Schulze | 360/105 |
| 5,074,029 | 12/1991 | Brooks, Jr. et al. | 29/603 |
| 5,095,396 | 3/1992 | Putnam et al. | 360/106 |
| 5,161,074 | 11/1992 | Forbord et al. | 360/97.01 |
| 5,198,945 | 3/1993 | Blaeser et al. | 360/104 |
| 5,422,764 | 6/1995 | McIlvanie | 360/97.01 |
| 5,491,597 | 2/1996 | Bennin et al. | 360/104 |
| 5,530,604 | 6/1996 | Pattanaik | 360/104 |
| 5,631,786 | 5/1997 | Erppelding et al. | 360/104 X |
| 5,644,454 | 7/1997 | Arya et al. | 360/104 X |
| 5,680,274 | 10/1997 | Palmer | 360/104 |
| 5,699,211 | 12/1997 | Magnusson et al. | 360/104 |
| 5,737,152 | 4/1998 | Balakrishnan | 360/104 |

*Primary Examiner*—John H. Wolff
*Attorney, Agent, or Firm*—Douglas R. Millett

[57] ABSTRACT

A suspension member has integral electrical conductor leads which extend along its length to a rear tail section. The leads extend beyond the tail section for electrical connection with a reception pad member. The distal ends of the leads have recessed areas in the terminal edge to encourage the flow of liquid solder into the joint. The tail section has a pair of tab members which are received in apertures in the reception pad member in order align the leads correctly.

10 Claims, 7 Drawing Sheets

TRANSDUCER SUSPENSION SYSTEM

BACKGROUND OF THE INVENTION

1. Field of the Invention

This invention relates generally to transducer suspension systems and more particularly to electrical connections for such systems.

2. Description of Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some recently proposed disk drives, the slider (or carrier) rides on a liquid film or bearing on the disk. A suspension assembly connects the slider to a rotary or linear actuator. The suspension provides support for the slider.

Examples of suspension systems are shown in the following references: U.S. Pat. No. 5,530,604, issued Jun. 25, 1996, by Pattanaik; U.S. Pat. No. 5,491,597, issued Feb. 13, 1996, by Bennin et al; U.S. Pat. No. 5,198,945, issued Mar. 30, 1993, by Blaeser et al; U.S. Pat. No. 5,161,074, issued Nov. 3, 1992, by Forbord et al; U.S. Pat. No. 5,095,396, issued Mar. 10, 1992, by Putnam et al; U.S. Pat. No. 5,074,029, issued Dec. 24, 1991 by Brooks, Jr. et al; U.S. Pat. No. 4,787,000, issued Nov. 22, 1988, by Schulze; U.S. Pat. No. 4,761,699, issued Aug. 2, 1988, by Ainslie et al; and U.S. Pat. No. 5,422,764, issued Jun. 6, 1995, by McIlvanie.

As disk drives have become smaller in size, the recorded track density has increased dramatically. This has necessitated the use of smaller and smaller heads and suspensions. However, the smaller geometries of the suspension and the head make it more difficult to manufacture the disk drive. In particular, it has become extremely difficult to attach the electrical leads along the suspension and connect them at the rear of the suspension to the rest of the drive electronics. These leads must be precisely and securely attached to their connections at the rear of the suspension in order for there to be a solid electrical connection. It is extremely difficult to make good solder connections with such small geometries.

SUMMARY OF THE INVENTION

Briefly, in a preferred embodiment of the invention, a suspension system comprises a suspension member having a first end for receiving a transducer assembly and a second end for attachment to an actuator member. The suspension system includes a plurality of planer electrical leads which run along the length of the suspension from the first to the second end. The actuator member includes an electrical reception pad member.

The planer leads of the suspension member extend beyond the second end of the suspension and abut the electrical pads on the electrical reception pad member. The distal ends of the planer leads each have a notched section which encourages the flow of molten solder between the lead and the corresponding pad.

The suspension member includes a plurality of alignment tabs on its second end. The electrical reception pad member has a plurality of corresponding apertures which receive the tabs such that the planer leads are precisely aligned with respect to the corresponding pads.

For a fuller understanding of the nature and advantages of the present invention, reference should be made to the following detailed description taken in conjunction with the accompanying drawings.

DESCRIPTION OF THE PREFERRED EMBODIMENTS

Figure 1:
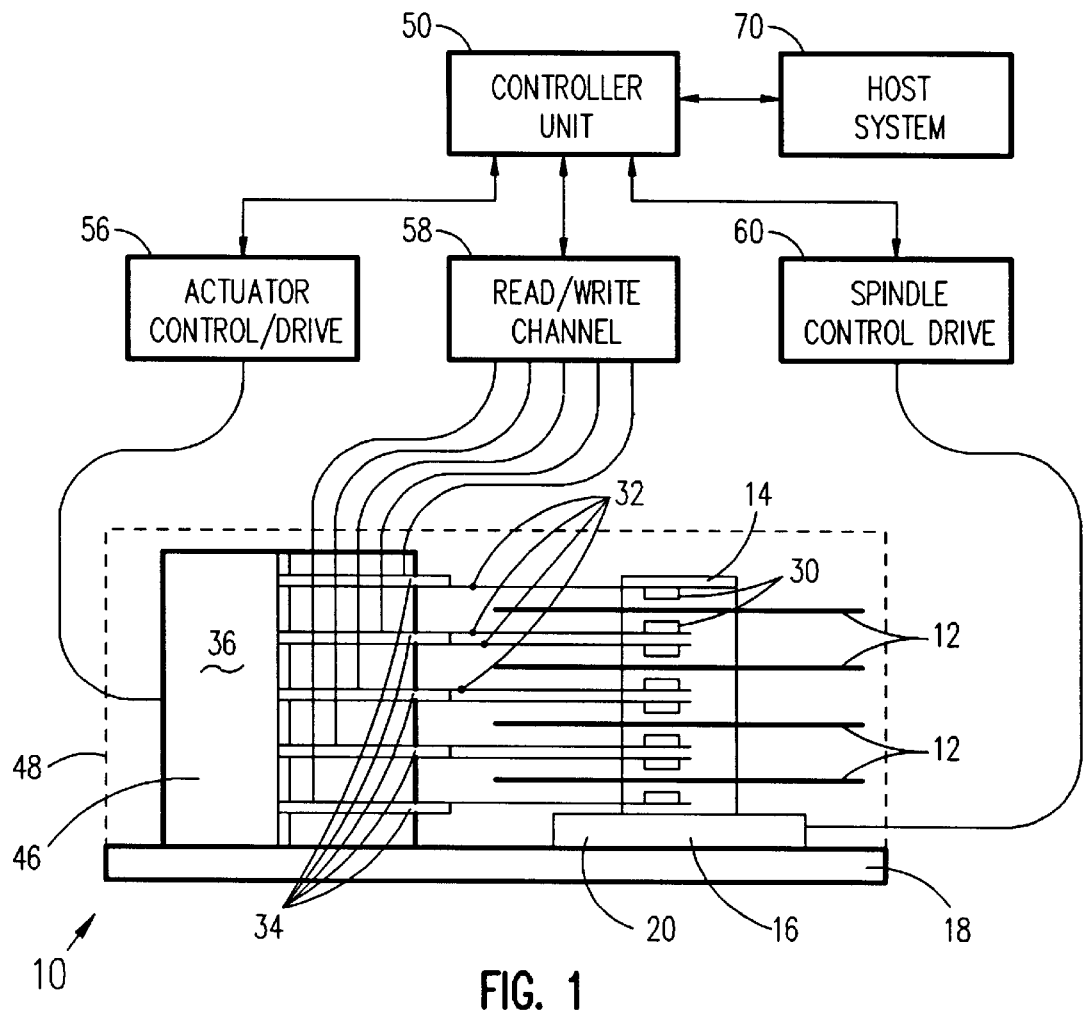
FIG. 1 is a schematic diagram of a data storage system of the present invention.
Figure 2:
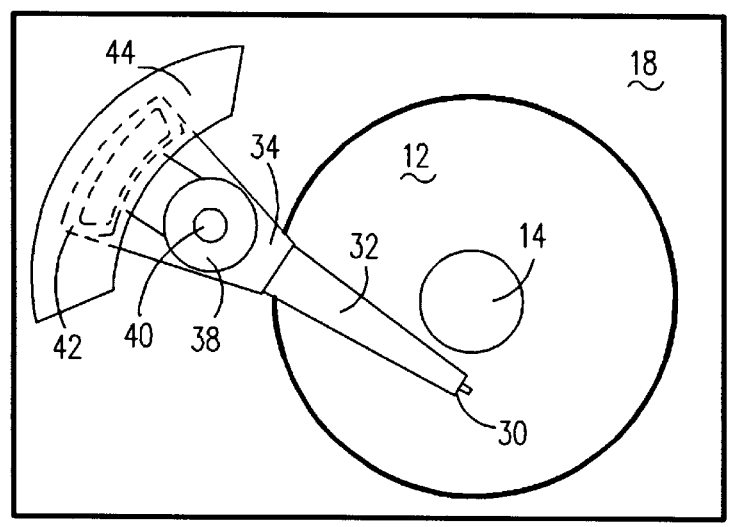
FIG. 2 is a top view of the system of FIG. 1.

FIGS. 1 and 2 show schematic diagrams of the data storage system of the present invention which is designated by the general reference number 10. System 10 comprises a plurality of magnetic recording disks 12. Each disk has a plurality of concentric data tracks. Disks 12 are mounted on a spindle motor shaft 14, which is connected to a spindle motor 16. Motor 16 is mounted to a chassis 18. The disks 12, spindle 14, and motor 16 comprise a disk stack assembly 20.

A plurality of read/write heads 30 are positioned over the disks 12 such that each surface of the disks 12 have a corresponding head 30. Each head 30 is attached to one of a plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The heads 30, suspension 32, arms 34 and actuator 36 comprise an actuator assembly 46. The disk stack assembly 20 and the actuator assembly 46 are sealed in an enclosure 48 (shown by a dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 70 may send digital data to controller 50 to be stored on disks 12, or may request the digital data be read from disks 12 and sent to the system 70. The basic operation of DASD units is well known in the art and is described in more detail in "Magnetic Recording Handbook", C. Dennis Mee and Eric D. Daniel, McGraw Hill Book Company, 1990.

Figure 3:
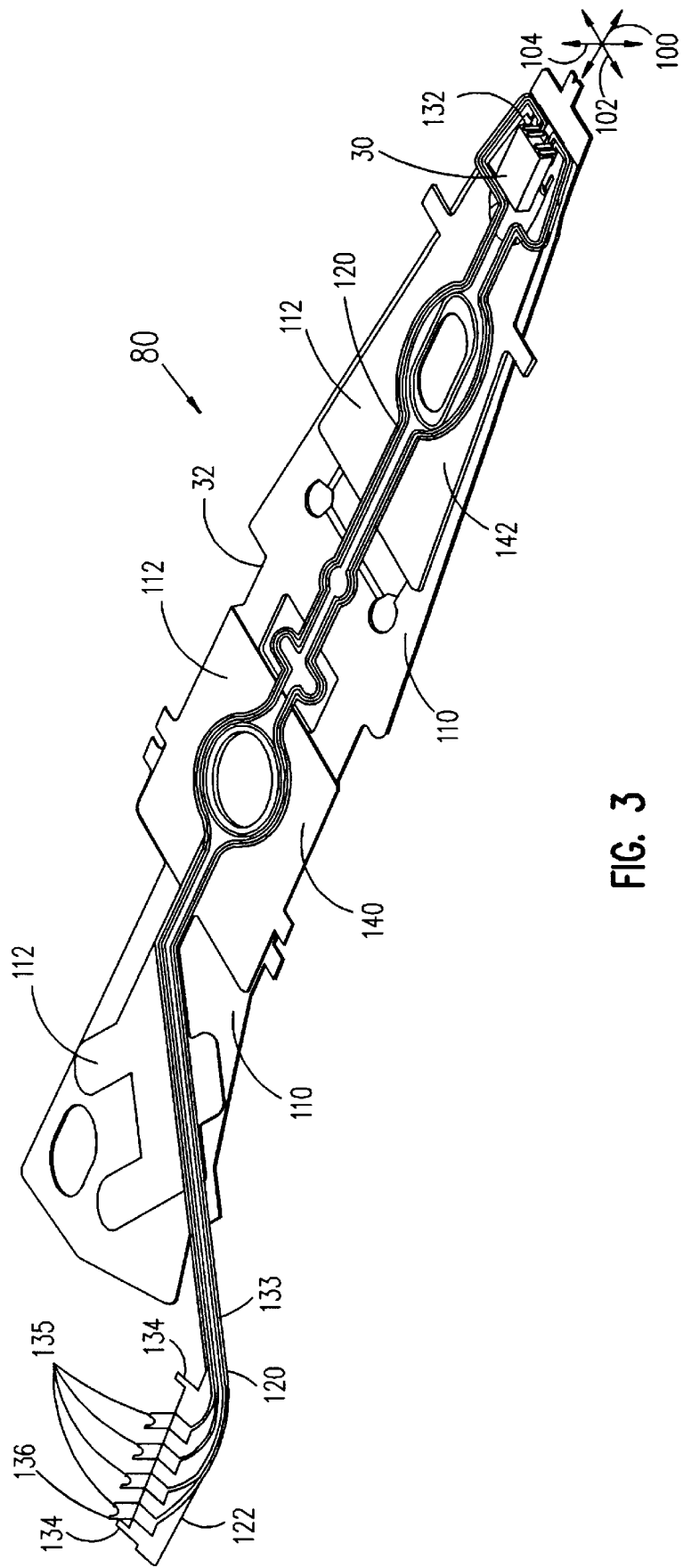
FIG. 3 is a detailed perspective view of a suspension system of FIG. 1.

FIG. 3 shows a perspective view of a head 30 attached to a suspension 32. This combination is referred to as a suspension assembly or head gimbal assembly (HGA) 80. Suspension 32 has a longitudinal axis 100, a lateral axis 102 and a vertical axis 104. Suspension 32 is comprised of a load beam 110 and a laminated member 112. Laminated member 112 is formed from a three-layer laminated material comprised of a steel support layer, electrically insulating layers, and electrically conductive layers. The various layers of the laminated member 112 are etched away in a photolithographic process to form the desired shapes.

The suspension 32 is extremely small. The distance from the point of attachment to the actuator arm 34 to the end of the suspension is typically about 22 mm. The head 30 typically measures 1.25 mm×1.00 mm×0.30 mm. These dimensions vary according the particular disk drive system. In the future, these dimensions will probably be even smaller.

The electrically conducting layer and electrically insulating layer are etched to form electrical lines (or leads) 120 which run from a rear termination pad area 122 to the head 30. Head 30 is comprised of a slider and transducer electronics. The electrical lines 120 terminate and are electrically attached to the head at the head termination pads 132. The electrical lines 120 are bent vertically upward at the head termination pads 132.

The pad area 122 is located on a tail member 133 which extends from the rear of the suspension 32. The pad area 122 has a pair of alignment tabs 134 which extend from the side of the pad area 122.

The electrical lines 120 each have a distal end 135 which extends beyond the pad area 122. The distal ends 135 are bent vertically upward and each one has a terminal edge which has a recessed notch 136. In a preferred embodiment, the shape of the notch is semicircular, however, other shapes such as "U" or "V" shapes could also be used.

The support layer of the laminated member 112 is formed into a base plate member 140 and a flexure member 142. The base plate member 140 is attached to an actuator arm 34 by swage, welding or an adhesive process. Flexure member 142 provides a gimbal mount for attachment of the head 30. The gimbal mount allows the head 30 to pitch in order to adjust its orientation (static attitude) to achieve the proper air bearing between the head 30 and disk 12 while the disk 12 is rotating. The flying height of the head 30 varies from near contact to 100 nm depending upon the design, but typically during operation is 15 nm or less height above the disk. Proper alignment of the head 30 on the gimbal mount is critical.

Both the base plate 140 and flexure 142 also serve the purpose of providing support for the electrical lines 120.

Figure 4A:
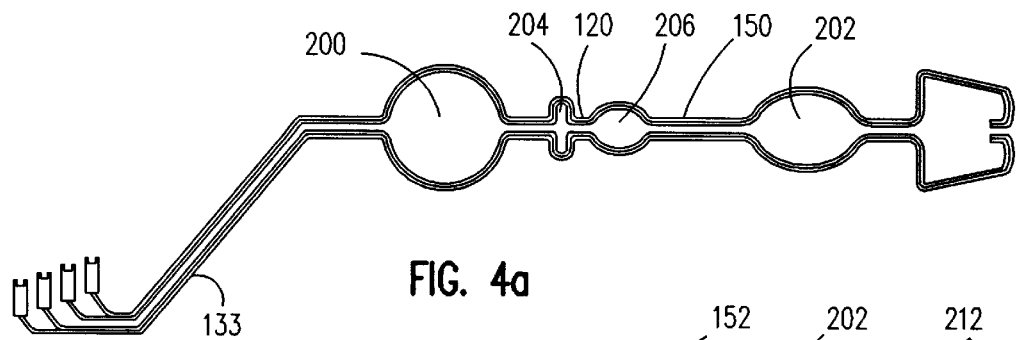
FIGS. 4a, 4b, 4c and 4d are top views of various layers of the suspension of FIG. 3.
Figure 4B:
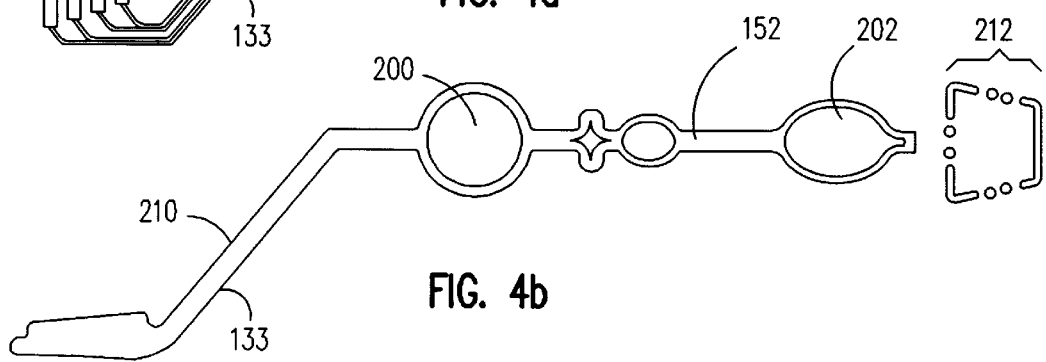
Figure 4C:
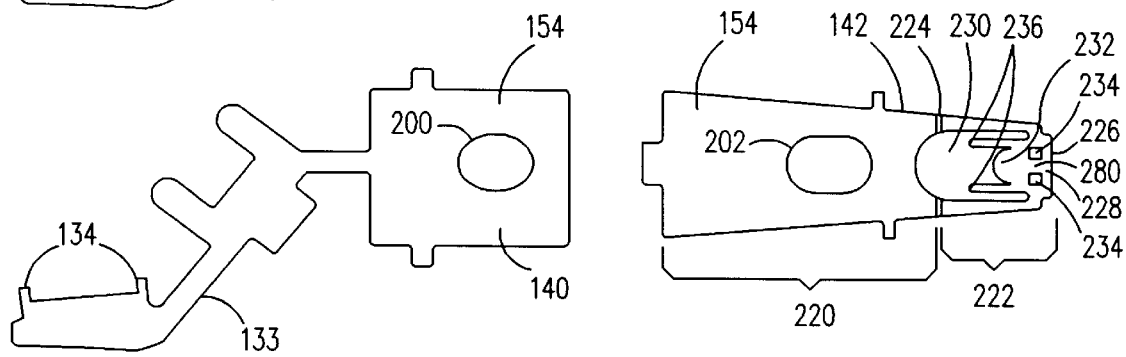

FIGS. 4a–4d show top views of the various overlying element layers of suspension 32. FIGS. 4a–4c show respectively, the electrically conducting layer 150, the electrically insulating layer 152, and the support layer 154 of the laminated member 112. Initially, the layers 150, 152, 154 are layers in a single laminated sheet of material. The member 112 is then formed from the sheet by using photolitho-graphic etch processes as are known in the art. Layer 150 is made of a conducting material such as copper. In a preferred embodiment, the material is copper and has a thickness of between 2 microns and 25 microns and preferably 18 microns. Layer 152 is made of an electrically insulating material and in a preferred embodiment is made of polyimide or Teflon and has a thickness of between 5 and 25 microns and preferably 18 microns. Layer 154 is made of a thin stiff material which is able to bend slightly, and in a preferred embodiment is made of stainless steel and has a thickness of between 12 and 30 microns and preferably 20 microns.

Referring now to FIG. 4a. The electrical lines 120 comprise four separate lines. In a preferred embodiment, two of the lines run to the inductive element in the head 30 which is used to write data and two of the lines 120 run to the magnetoresistive element in the head 30 which is used to read data. Each of the lines has a thin rectangular cross section having a relatively large surface area on the top and bottom surfaces and relatively small surface area on the side surfaces. Lines 120 start at the termination pad area 122. The distal ends 135 provide connection to the read/write channel 58. The lines 120 run from the side of the arm 34 towards the center longitudinal access 100 of the suspension 32. The lines 120 then run in a generally longitudinal direction toward the head 30. The lines 120 may be plated with gold in order to facilitate the solder connection process.

The lines separate to run along both sides of apertures 200 and 202. The apertures 200 and 202 are used to provide access for tooling pins which are used to align the laminated member and the load beam during manufacturing. Another separation of lines 120 occurs at points 204 and 206 and are used to provide some slack in the lines 120 to allow for movement of the suspension during operation.

At the distal end of suspension 32, the lines 120 separate and run along either side of head 30, then turn backward toward the head 30 to terminate at the front face of head 30 at the head termination pads 132. This is necessary because the transducer electronics are located on the front face of the slider. The lines 120 are bent 90° vertically in order to interface with pads 132.

FIG. 4b shows a top view of the electrically insulating layer 152. Layer 152 lies between layers 150 and 154. Layer 152 is shaped to provide electrical insulation protection to the lines 120 in layer 150 which directly overlay the layer 152. Layer 152 forms an insulating strip 210 directly beneath the lines 120. At the head area, layer 152 is shaped into a series of pads 212 which underlie lines 120. This is done to allow the lines 120 to be more flexible at the head area such that lines 120 do not interfere with movement of the head 30.

FIG. 4c shows a top view of the support layer 154. Base plate member 154 provides support for the rear section of the lines 120. Flexure member 142 has a rear portion 220 and a front portion 222. The front portion 222 is raised slightly above the plane of rear portion 220 by means of a stamped bend 224. The front portion 222 has a distal end 226 having a front platform 228 which provides support for lines 120. Behind platform 228 is a flexure aperture 230. A tongue section 232 provides support and an attachment point for head 30. Between tongue section 232 and platform 228 are a pair of rectangular apertures 234. Apertures 234 allowed the lines 120 to bend as they approach the termination pads 132. A pair of tabs 236 extend from tongue section 232 and function as motion limiters when they are bent back under load beam 110. A section 280 (know as the dog bone) is located between the apertures 234.

Figure 4D:
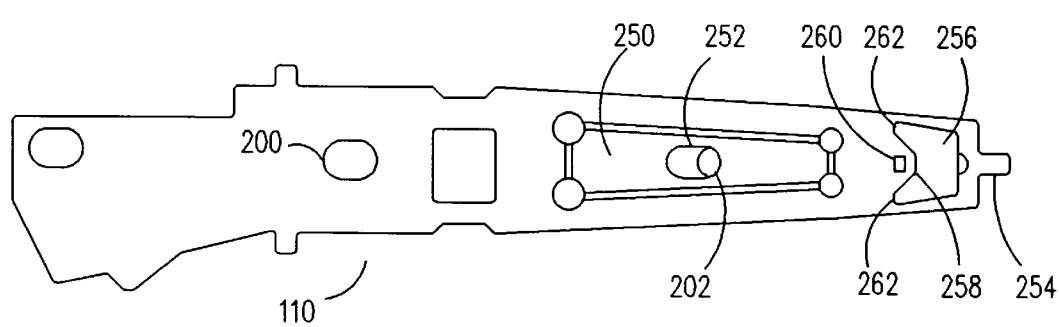

FIG. 4d shows a top view of load beam 110. Load beam 110 is generally flat and rigid and made of a stainless steel or other rigid material. In the preferred embodiment, the load beam 110 is stainless steel of about 0.025 to 0.075 mm thick and preferably 0.038 mm. It is desired to maintain the weight and inertia of the load beam 110 as small as possible without compromising its structural rigidity.

Load beam 110 has a depressed section 250 which is used to provide additional structural stiffness. Section 250 has an aperture 252 which is used for locating the suspension during the assembly process.

Load beam 110 has a distal end with a tab 254 which is used for merging the slider over the disk and loading/unloading of the slider during operation of the disk. An aperture 256 is located behind tab 254. A tongue section 258 extends into aperture 256. A stamped raised button or dimple 260 is located on tongue 258. Dimple 260 contacts tongue section 232 of flexure member 154 and allows head 30 to gimbal (pitch and roll) slightly such that it allows the air bearing to follow the disk contour as it flies over the disk. A pair of corners 262 of aperture 256 provide a contact point for tabs 236 of flexure 154 such that tabs 236 pass under load beam 110 and provide a motion limiting function for the flexure member 154. Load beam 110 is also formed by a photo lithographic process and the raised features are stamped.

The laminated member 112 and the load beam 110 are attached to each other by laser welding while the pieces are held in tooling pins which pass through apertures 200 and 202.

Figure 5:
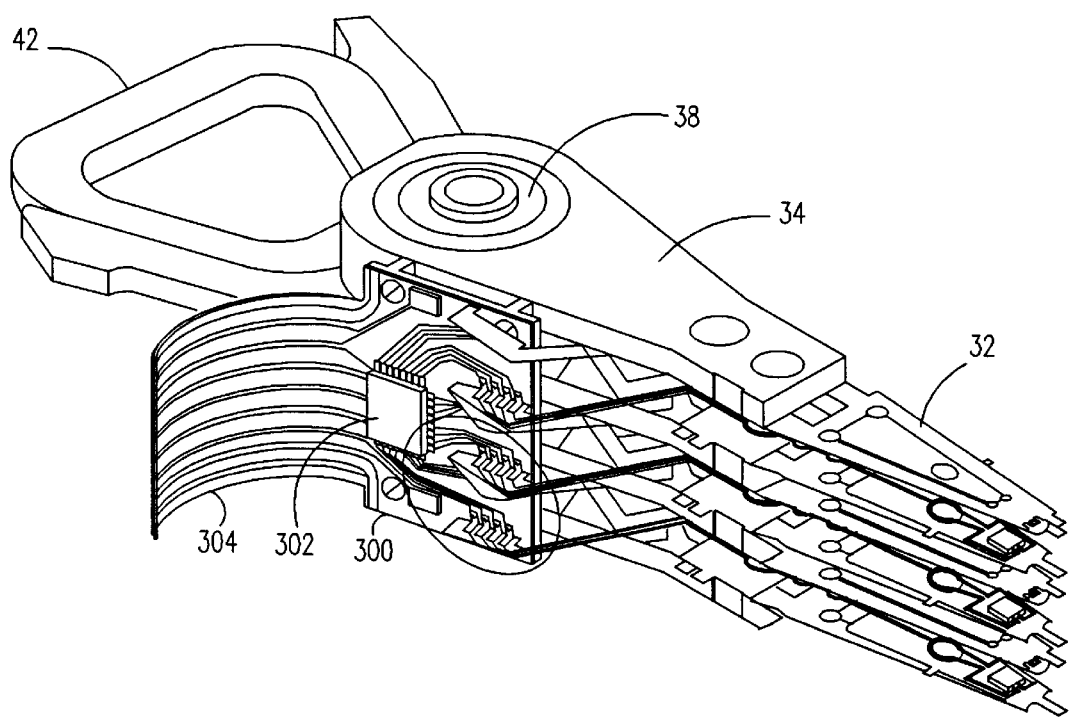
FIG. 5 is a perspective view of the suspension member and the actuator.

FIG. 5 shows a perspective view of the actuator assembly 46. The plurality of suspensions 32 are attached to the actuator arm 34 by swaging, welding, adhesive or other suitable attachment means. An electrical reception pad member 300 is mounted vertically to the sides of arms 34 by a plurality of screws, however, other attachment means may also be used. The member 300 contains an arm electronics module 302 (integrated circuit) which is connected to the rest of the drive electronics by a flex cable 304. The tails 133 of the suspensions 32 are positioned between the arms 34 and are attached at the rear termination pad areas 122 to the member 300.

Figure 6:
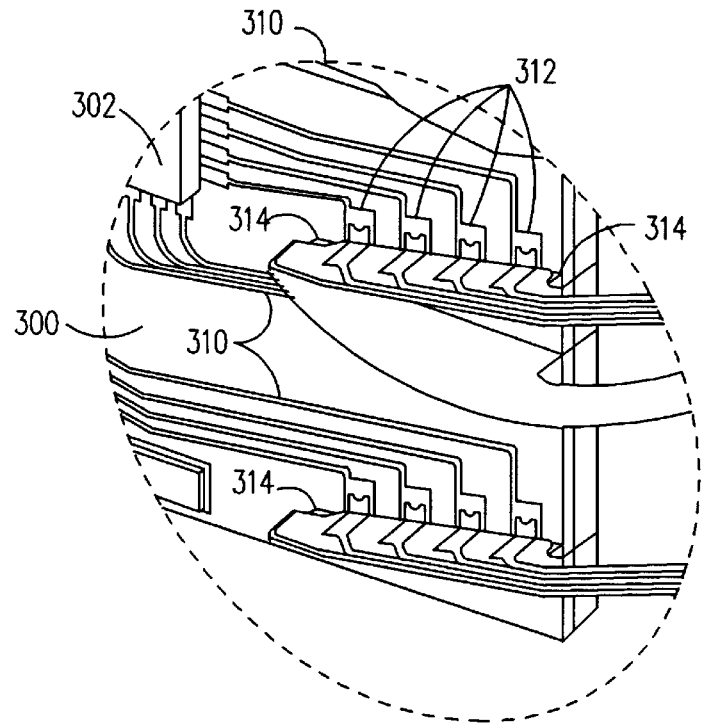
FIG. 6 is a detailed perspective view of a portion of FIG. 5.

FIG. 6 is a detailed perspective view of the encircled area of FIG. 5. A module 302 is electrically connected to a plurality of electrical leads 310 which run from module 302 to the plurality of electrical reception pads 312.

Member 300 has a plurality of tab apertures 314 which receive the tabs 134 of suspensions 32. The distal ends 35 of lines 120 abut the pads 312 and are soldered in place as described in more detail below.

Figure 7:
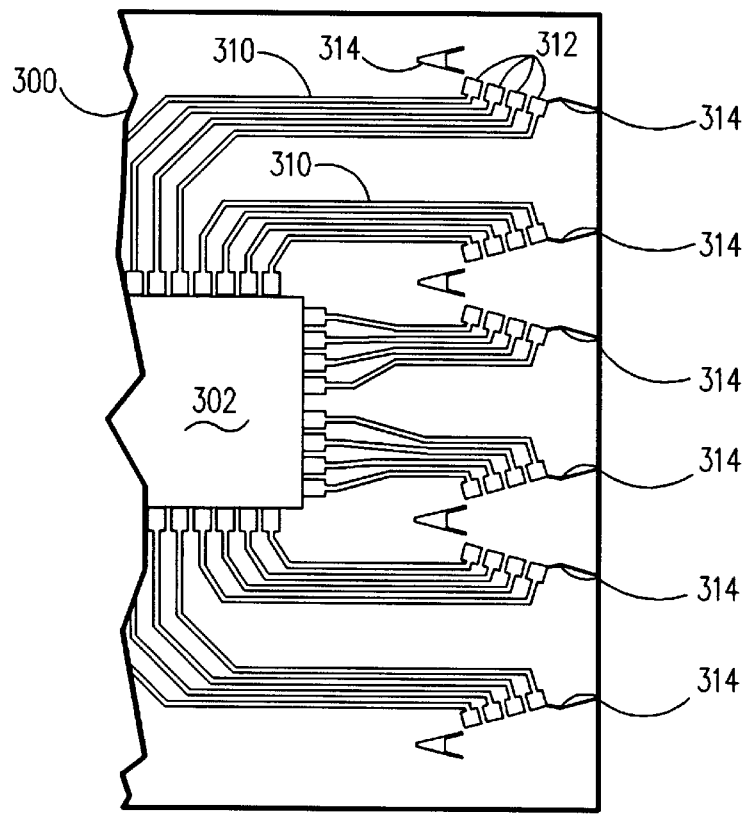
FIG. 7 is a side view of the electrical pad reception member.

FIG. 7 is a side view of the reception pad member 300 which more clearly shows the arrangement of the lines 310, reception pads 312, and apertures 314.

Figure 8:
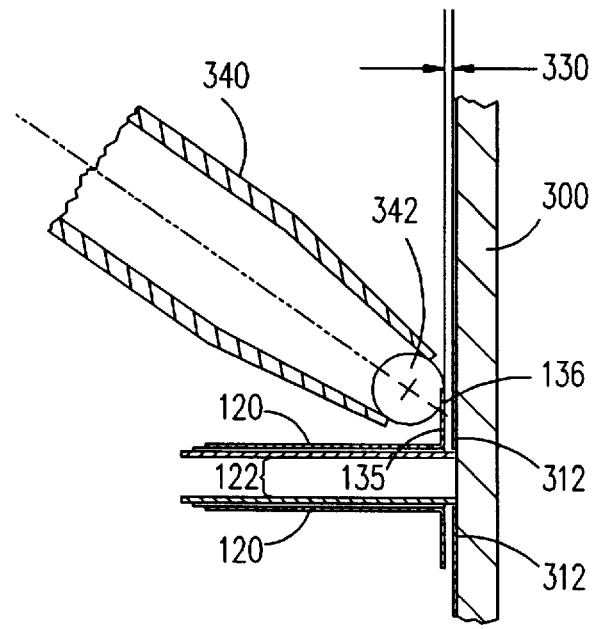
FIG. 8 is a cross sectional view of an electrical connection process.

FIG. 8 shows a cross sectional view of a process for attaching leads 120 to the pads 312. The suspensions 32 are first positioned in place proximate to their respective actuator arms 34. The tabs 134 are placed in apertures 314 such that distal ends 135 of lines 120 are aligned with pads 312. A distance 330 is left between distal ends 135 and pad 312. Significant damage to the lines 120 may occur during the attachment of the suspensions 32 to the arms 34 and the distance 330 reduces the possibility of such damage. This distance 330 is in a range between 50 um and 100 um.

After the suspensions are attached to arms 34, the electrical attachment process may begin. A solid solder ball 342 is placed on the notch 136 of a distal end 135 of a line 120.

The solder ball 342 is placed there by a capillary 340 of a device commercially available from the Fraunhofer Institute for Reliability and Micro Integration, of Berlin, Germany. The principles of operation of the Fraunhofer device are disclosed in a published international patent application, No. PCT/DE94/00678, Publication No., WO95/00279. The device has a reservoir of solder balls of controlled diameter and dispenses one ball at a time through the capillary 340. The solder ball 342 is very lightly held on the line 120 by the capillary 340 and a flowing nitrogen gas. The solder ball 342 is reflowed on site by a focused laser beam which runs along the central axis of the capillary 340. In the preferred embodiment, the focused laser beam is supplied by an Nd:YAG laser, however, other lasers are also suitable to create the desired solder connection.

On reflow, the solder ball 342 melts, flows, and wets the corresponding distal end 135 and pad 312, forming a solid solder joint. The notch 136 in the distal end 135 of line 120 provides a registration feature for locating the solder ball 342 so that it is in simultaneous contact with both the distal end 135 and the pad 312. Notch 136 also provides an edge which draws the liquid solder into the joint by surface tension. This ensures a good electrical connection is made. Without the notch, the solder would tend to flow on the outside of the line 120 away from the pad 312.

Figure 9:
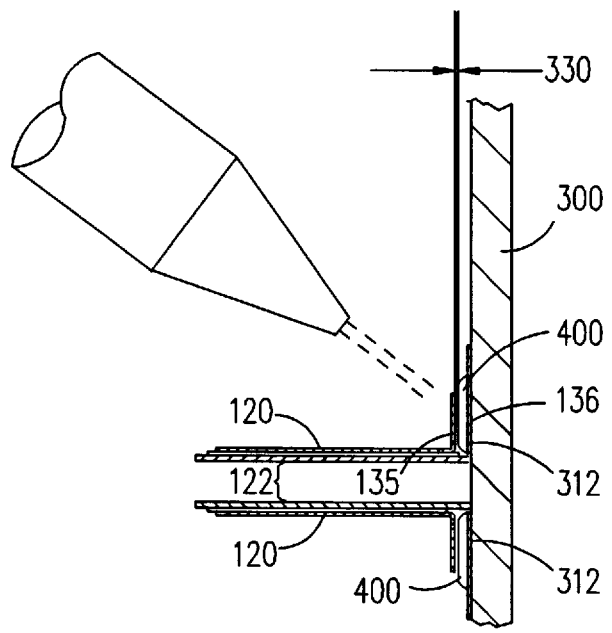
FIG. 9 is a cross sectional view of an alternative embodiment of the electrical connection process.

FIG. 9 shows a cross sectional views of an alternative method of forming the electrical connection between the leads 120 and the pads 312. In this embodiment, flattened solder balls 400 (otherwise known as "solder bumps") are first placed upon pads 312. Leads 120 are positioned next to the flattened solder bumps 400 spaced a distance 330 apart. A laser such as a ND:YAG or Xenon lamp is used to heat the flattened solder bump 400 to a liquid state such that it reflows forming a solder connection between lines 120 and pads 312. A more detailed description of a reflow process is described in U.S. Pat. No. 5,530,604 issued Jan. 25, 1996 by Pattanaik.

Figure 10:
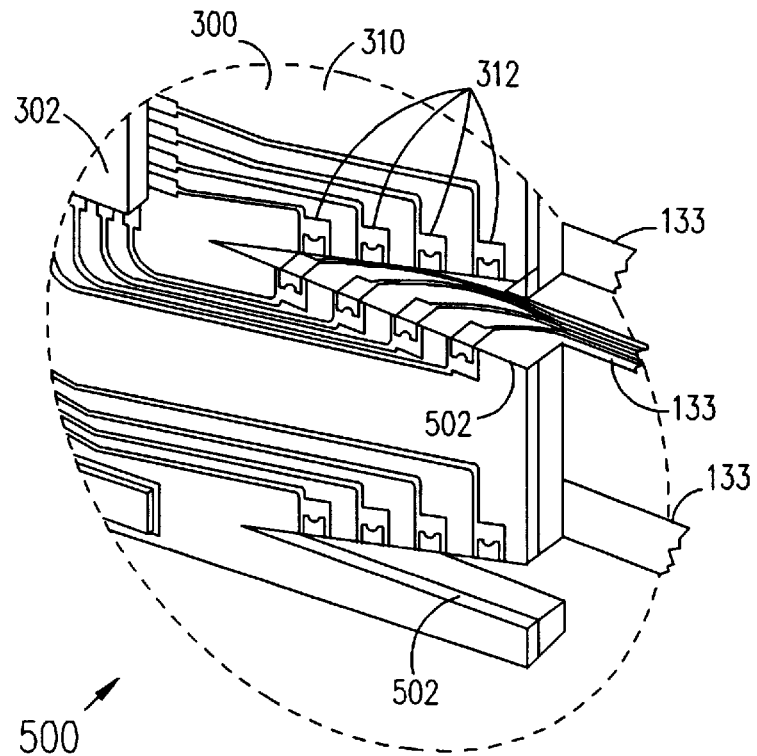
FIG. 10 is a detailed perspective view of an alternative embodiment of the electrical connection process.

FIG. 10 shows a detailed perspective view of an alternative embodiment of the present invention and is designated by the general reference number 500. In this embodiment 500, the electrical reception pad member 300 has "V" shaped notches 502 along the edge facing towards the suspension 32. The pads 312 are arranged along the border of the notch 502. The tail section 133 of each suspension 32 now passes behind the member 300. This is in contrast to the other embodiment where the tail section 133 passed along the front side of member 300. The lines 120 run through the notch 502 and the distal ends 135 are bent 900 over the edge of member 300 to interface with pads 312. The electrical connection may be made with the solder processes as previously described.

Figure 11:
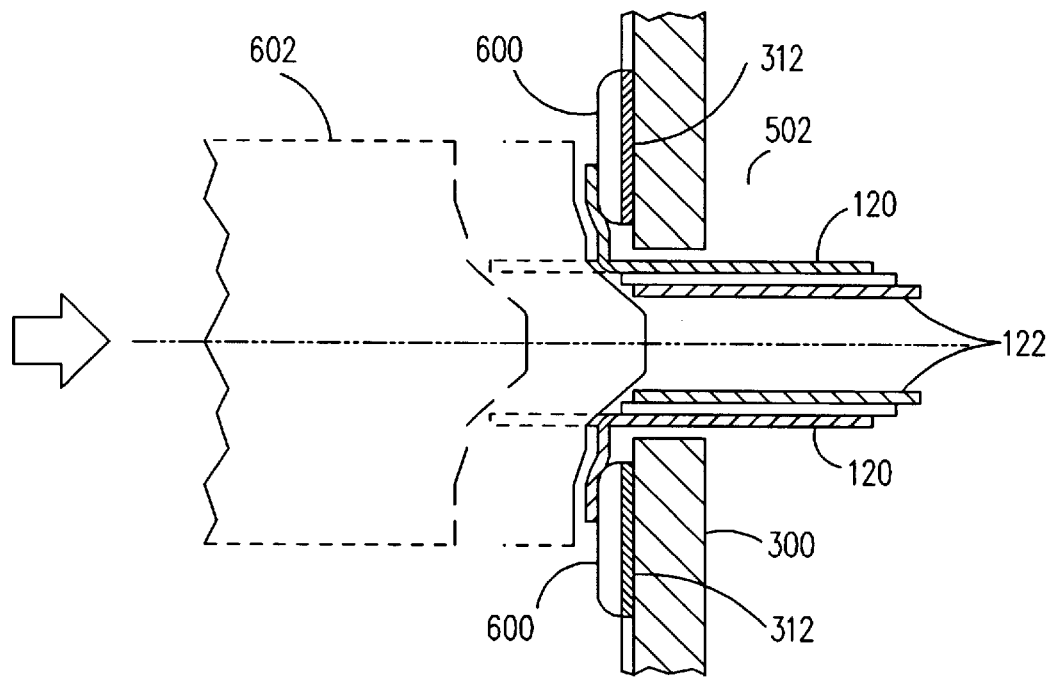
FIG. 11 is a cross sectional view of a process of FIG. 10.

FIG. 11 shows a cross sectional view of one method of making the electrical connection in the case of embodiment 500. Flattened solder bumps 600 are first placed on pads 312. Leads 120 are positioned in notch 502 such that the distal ends 135 extend straight out perpendicular to the front face of member 300. A solder tool 602 or heating iron is pressed between the notch 502. The tool 602 is shaped to gently bend the distal ends 135 of lines 120 over and towards pads 312. Note that two lines 120 on either side may be done at the same time. The tool 602 also heats the solder bumps 600 such that they reflow between the line 120 and the pad 312 forming the electrical connection. The advantage is that the solder tool 602 completes the combined steps of bending the lines 120 and forming the solder connection in a single step.

While the preferred embodiments of the present invention have been illustrated in detail, it should be apparent that modifications and adaptations to those embodiments may occur to one skilled in the art without departing from the scope of the present invention as set forth in the following claims.

We claim:

1. A suspension system comprising:

a suspension member having a first and a second ends, the first end for receiving a transducer and the second end for attachment to a support member;

a plurality of substantially planar electrical conductor leads running along the suspension member from the first to the second end, the leads each extending beyond the second end to form a planar electrical tab member, each tab member terminating at a distal end having a recessed section in its terminal edge, each planar tab member bent such that its planar surface is substantially perpendicular to the planar surface of the planar electrical conductor leads, and an electrical reception pad member having a plurality of electrical pads corresponding to the tab members, each tab member being solder connected to a respective electrical Pad with solder located within the recessed section of the tab member.

2. The system of claim 1, wherein the recessed section is a notch.

3. The system of claim 2, wherein the notch is semicircular in shape.

4. The system of claim 1, further comprising a support member attached to the suspension member and the electrical reception pad member.

5. The system of claim 4, wherein the suspension member has at least one alignment member extending from its second end, and the reception pad member has an aperture for receiving the alignment member, the alignment member projecting in a direction substantially perpendicular to the surface of the reception pad member, the location of the aperture and alignment member causing the electrical tab members to align correctly with their respective electrical pads on the reception pad member.

6. A suspension system comprising:

a suspension member having a first and a second ends, the first end for receiving a transducer and the second end for attachment to a support member;

a plurality of substantially planar electrical conductor leads running along the suspension member from the first to the second end, the leads each extending beyond the second end to form a planar electrical tab member, each tab member terminating at a distal end having a recessed section in its terminal edge, each planar tab member bent such that its planar surface is substantially perpendicular to the planar surface of the planar electrical conductor leads, and an electrical reception pad member having a plurality of electrical pads corresponding to the tab members, each tab member being solder connected to a respective electrical sad with solder located within the recessed section of the tab member;

a transducer element attached to the suspension member;

a data storage disk located proximate to the transducer element;

a rotation device for rotating the disk;

a movement device for moving the transducer relative to the disk.

7. The system of claim 6, wherein the recessed section is a notch.

8. The system of claim 7, wherein the notch is semicircular in shape.

9. The system of claim 6, further comprising a support member attached to the suspension member and the electrical reception pad member.

10. The system of claim 6, wherein the suspension member has at least one alignment member extending from its second end, and the reception pad member has an aperture for receiving the alignment member, the alignment member projecting in a direction substantially perpendicular to the surface of the reception pad member, the location of the aperture and alignment member causing the electrical tab members to align correctly with their respective electrical pads on the reception pad member.

* * * * *